Nov. 10, 1925.
W. D. COOPER
1,560,539
IDENTIFYING MEANS FOR MOTOR VEHICLES
Filed Nov. 19, 1923     2 Sheets-Sheet 1
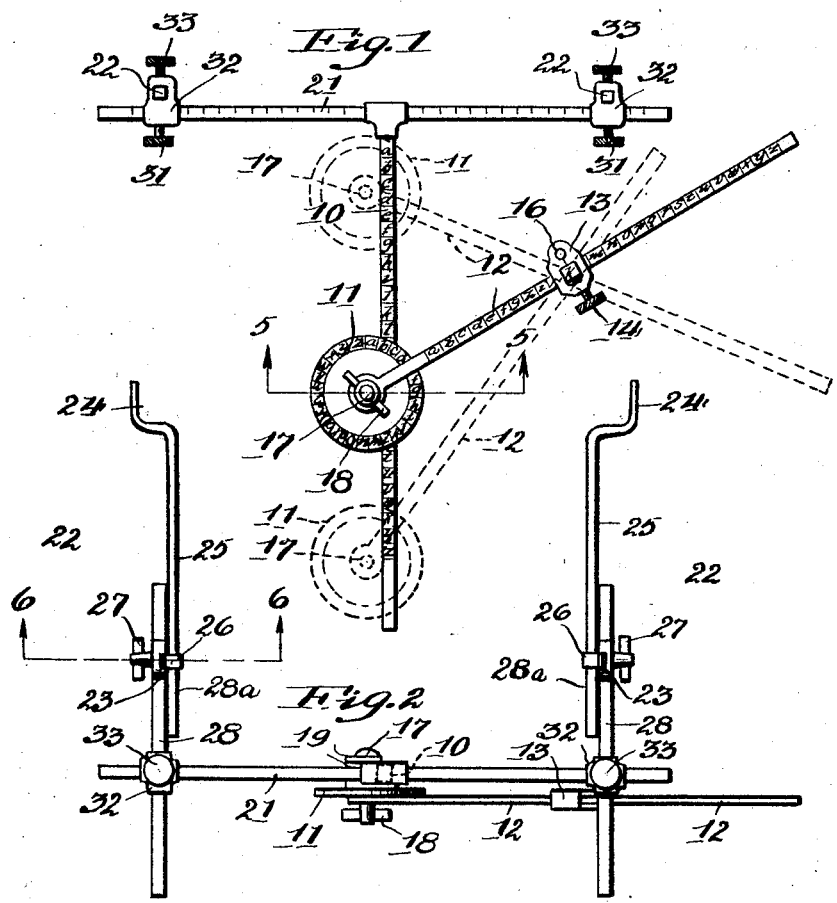
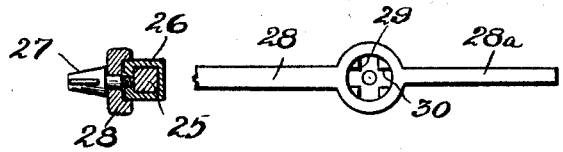
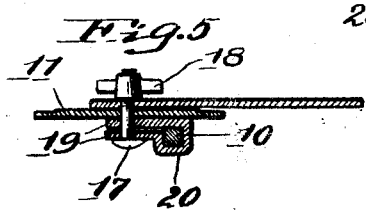
Inventor
William D. Cooper
By John E. Stryker
His Attorney Nov. 10, 1925.  1,560,539
W. D. COOPER
IDENTIFYING MEANS FOR MOTOR VEHICLES
Filed Nov. 19, 1923
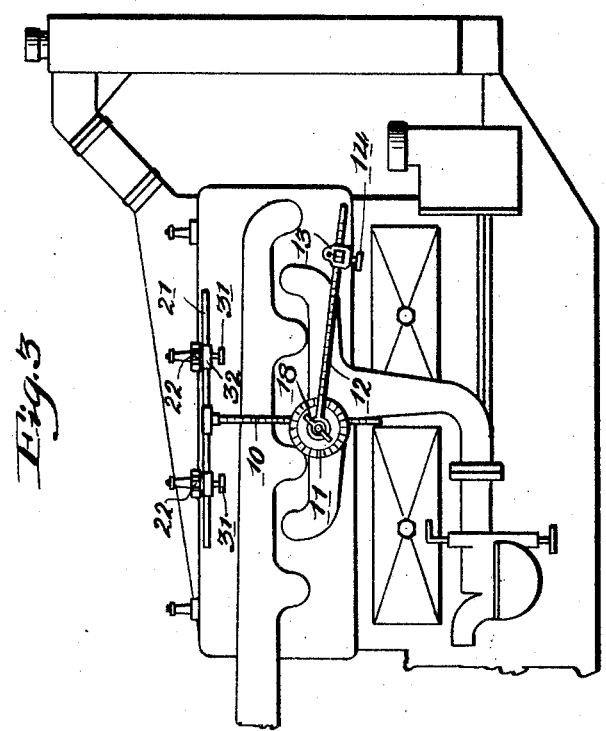
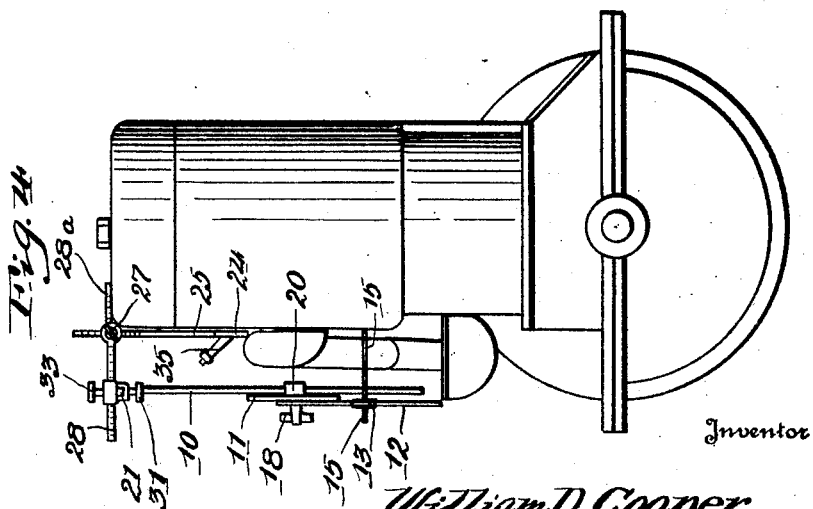

Patented Nov. 10, 1925.

1,560,539

UNITED STATES PATENT OFFICE.

WILLIAM D. COOPER, OF ST. PAUL, MINNESOTA, ASSIGNOR OF FORTY-NINE TWO-HUNDREDTHS TO HENRY WEILLER AND FORTY-NINE TWO-HUNDREDTHS TO ROBERT C. SWEET, BOTH OF ST. PAUL, MINNESOTA.

IDENTIFYING MEANS FOR MOTOR VEHICLES.

Application filed November 19, 1923. Serial No. 675,501.

*To all whom it may concern:*

Be it known that I, WILLIAM D. COOPER, a citizen of the United States, residing at St. Paul, in the county of Ramsey and State of Minnesota, have invented new and useful Improvements in Identifying Means for Motor Vehicles, of which the following is a specification.

This invention has for its object the protection of motor vehicles by providing identifying means whereby a stolen vehicle can be quickly and easily recognized as such and the thief apprehended.

More particularly, it is my object to identify vehicles by means of marks, the location of which, as measured by an instrument adapted to register coordinates, is the distinguishing feature.

Another object is to provide an instrument of this kind adapted to be manipulated to obtain a plurality of combinations of coordinates for a given mark, any one of which combinations will accurately locate the mark.

A further object is to provide means for mounting on any of the common types of cars a basic element from which measurements are taken in a predetermined, definite position.

As is well known, the practice among automobile thieves is to replace the license plate of the stolen vehicle to prevent identification. Attempts have been made to afford protection by placing numbers on various parts of the frame and motor, but such marks have the disadvantage of being extremely difficult to find because of the difference in construction of the various makes of cars and are also too complicated to be easily and accurately memorized and transmitted on account of the large number of digits necessarily employed. Further, it is extremely difficult, if not impossible, to place a series of numerals on a motor vehicle in such a way that they are not removable or changeable.

I propose to place a simple mark, such as that made by a drill or punch, on the vehicle (preferably on the motor) and provide an instrument whereby the mark can be identified by its location. My instrument is so constructed that the position of the mark may be determined by any one of a number of combinations of coordinates. For each vehicle marked, one of the combinations will be the truly identifying, basic combination which is kept secret, being recorded in a public office and known only by the legal owner of the vehicle. The identifying mark itself may be conspicuous or it may be concealed, either by a covering of paint or the like, or under some removable part such as a nut or head of a bolt so that it cannot be identified by one not knowing its coordinates.

Referring to the drawings, which illustrate the best form of my invention at present known to me, Figure 1 is a side elevation of the device; Fig. 2 is a plan view of the same; Fig. 3 is an elevation showing the method of mounting the device on one type of motor; Fig. 4 is an end view of the instrument as applied to a motor of a different type from that shown in Fig. 3; Fig. 5 is a section taken on the line 5—5 of Fig. 1; Fig. 6 is a section taken on the line 6—6 of Fig. 2; and Fig. 7 is a detail side elevation showing the joint in one of the gauge arms.

In the drawings I have used the numeral 10 to indicate a downwardly extending member adapted to be supported in a predetermined, definite position adjacent to one side of any of the common types of motors. This member 10 constitutes a basis element from the upper end of which the coordinates of identifying marks are measured. A dial 11 provided with a radius rod 12 is adjustable longitudinally on the member 10. Slidable longitudinally on the rod 12 is an index support 13 which may be secured in any desired position on said rod by means of a set screw 14. An index finger 15 (Fig. 4) is adapted to be slidably inserted in a perforation 16 in the support 13 to accurately indicate points on the motor which may be offset from the index support 13. The rod 12 is pivotally supported at the center of the dial 11 upon a bolt 17 provided with a wing nut 18. The bolt 17 passes through a pair of ears 19 on a clamp 20, surrounding the member 10, so that by manipulating the nut 18 the dial 11 may be fixed in any position on the member 10 and the rod 12 may be simultaneously secured in any desired radial position on the dial 11.

In order to locate the member 10 in a definite, predetermined position on any of the common makes of motors, I prefer to suspend said member, in parallel relation with one of the lateral cylinder walls, from the upper surface of the cylinders. As it is the almost universal custom to provide spark plugs for the ignition system of motors, I utilize such plugs as the means for centering or definitely locating the member 10. To support the latter member, a normally horizontal bar 21 is rigidly secured to its upper end and gauge arms 22, extending at right angles to the bar 21 and adjustable longitudinally thereon, are adapted to rest on the top of the motor. The arms 22 are articulated at 23 and formed with fingers 24 adapted to embrace or be placed in contact with opposite peripheries of a pair of the spark plugs 35. A member 25 of each of the arms 22 is adjustable longitudinally in a clamp 26 (Figs. 2, 6 and 7) while wing bolts 27 pass through the other members 28 of said arms and are threaded in the clamps 26. Crossed grooves 29 and 30 in the members 28 are adapted to receive the edges of the clamps 26 to allow the members 25 to be secured in parallel relation with, or at right angles to, the members 28. Thus, by loosening the wing bolts 27 the length of the arms 22 and angular position of the members 25 may be changed. Set screws 31 are arranged to be manipulated to adjust a pair of brackets 32 carrying the arms 22 on the bar 21, another pair of set screws 33 being provided in the brackets 32 to permit longitudinal adjustment of the arms 22 in said brackets. The bar 21 and members 25 and 28 of the arms 22 are graduated to facilitate placing the brackets 32 at equal distances from the member 10 and to make it easy to uniformly adjust the lengths of the arms 22.

*Operation.*

To apply my instrument to a motor like that shown in Fig. 3, in which the spark plugs are on the top of the cylinders, the lengths of the gauge arms 22 are first uniformly adjusted so that the two approximately central spark plugs will fit into the angles of the fingers 24, while the member 10 is suspended parallel to the axis of one of the cylinders and free of any obstruction on the cylinder wall (see Fig. 3). After loosening the screws 31, the bar 21 carrying the member 10 is adjusted by reference to the graduations on said bar so that the member 10 is midway between the arms 22 when the screws 31 are tightened. The device is now ready to locate an identifying mark. The mark having been placed on any desired or convenient part of the motor within the radius of the rod 12, the coordinates are measured by holding the index finger 15 on the mark, while the support 13 is made fast on the rod 12, said rod being fastened in the desired position by manipulating the wing nut 18. Now the coordinates may be easily read by reference to the scales on the member 10, dial 11 and rod 12.

As shown in Fig. 4, when a motor has spark plugs 35 on the cylinder walls instead of on top, the gauge arm members 25 are extended downward by loosening the bolts 27 and turning the clamps 26 into the normally vertical grooves 29 in the members 28. With the extensions 28ª of the members 28 resting on the top of the cylinders, the lengths of the arms 22 are uniformly adjusted so as to embrace the middle plugs between the fingers 24, other adjustments being similar to those described above. The device of the present invention, as will be readily understood, is adapted to be applied to motors of various designs, and obstructions such as intake and exhaust manifolds and other attachments on the motors do not interfere with the accurate measurement of coordinates.

For convenience, I have used the letters of the alphabet to indicate the several graduations. For example, the setting shown in full lines in Fig. 1 would be indicated by the coordinates "ldk". For each identifying mark placed on the motor, there will be a plurality of settings of the instrument (as indicated in dotted lines in Fig. 1) and a corresponding number of combinations of coordinates. The mark in question can be found by anyone knowing a single combination of the coordinates of the mark.

One or more of the combinations or series of coordinates of a given mark having been determined by my instrument, I propose to arbitrarily choose one series as the secret or truly identifying combination and to record the chosen series in a public office. This secret series will otherwise be known only by the owner of the vehicle. By reason of the fact that so few characters are utilized in each series of coordinates, accurate memorizing and transmitting of the identifying characters is facilitated. For convenience, the coordinates of a particular mark, other than the secret series may be referred to as the "secondary" series or combinations.

One method of using my protecting means would be to conceal the identifying marks on the motor vehicles. A thief if asked to give the identifying coordinates of the vehicle in his possession, would obviously be unable to give the secret combination even if he had an instrument of the kind described and could find the mark on the vehicle in question. If he had the instrument, he might give one of the secondary series of coordinates for the vehicle in question. Upon inquiry at the office of record, the fact that the thief could not give the secret series could be quickly determined. To further ascertain whether or not a particular vehicle was the one stolen, the instrument could be quickly applied to the motor by one knowing one of the secondary series of coordinates and the identifying mark found.

Another method of utilizing my identifying means would be to make the marks on the vehicles conspicuous and to inform those seeking a stolen car of one of the secondary series of coordinates for the vehicle sought. On account of the large number of places on a motor where identifying marks can be placed, it is highly improbable that the coordinates of the identifying mark on the stolen vehicle would be the same as those of another vehicle in possession of a suspected thief. Therefore, where the identifying mark is made conspicuous, the identity of a car could be ascertained in the first instance by a person knowing one series of coordinates of the car. The identity could be further checked by requiring a suspected thief to give the secret coordinates. On account of the remote possibility of a thief guessing the secret coordinates of any particular car, it will be readily understood that thefts of motor vehicles will be made extremely dangerous when my identifying means come into general use.

While I have illustrated mechanism in which combined vectorial and polar coordinates are employed, I do not wish to limit myself to any particular system or systems of coordinates because it is obvious that other systems might easily be incorporated in a device of the kind in such a manner as to come within the broad scope of my invention.

Having described my invention what I claim as new and desire to protect by Letters Patent is:

1. A device of the class described comprising, an element adapted to be mounted in a predetermined position on a motor vehicle, and a plurality of graduated members carried by said element and arranged to be manipulated to measure the coordinates of identifying marks on the vehicle.

2. A device of the class described comprising, an element adapted to be mounted in a predetermined position on a motor vehicle, and a graduated dial and radius rod carried by said element and arranged to be manipulated to measure the coordinates of identifying marks on the vehicle.

3. A device of the class described comprising, a basic graduated element, means connected to said element and adjustable to fit different types of motors, for locating said element in a predetermined, definite position on motors and a series of graduated members connected to said element and arranged to be placed in a plurality of positions relative to each other to measure the coordinates of a given identifying mark on a motor, whereby a plurality of combinations of coordinates are obtained, each combination indicating the location of said mark.

4. In a device of the class described, a graduated member adapted to be mounted in a predetermined position on a motor, a dial adjustable longitudinally on said member, a radius rod pivotally carried on said dial, and means carried by said rod for indicating the location of identifying marks on said motor.

5. In a device of the class described, a graduated member adapted to be supported adjacent to one side of a motor having spark plugs, means connected to said member and adapted to engage a pair of said plugs to fix said member in a predetermined position on the motor, a dial adjustable longitudinally on said member, a radius rod pivotally mounted on said dial and means carried by said rod for indicating the location of an identifying mark on said motor.

6. In a device of the class described, a normally horizontal bar adapted to be mounted in a predetermined position on a motor, a graduated member supported on said bar, a dial adjustable longitudinally on said member, a radius rod pivotally carried on said dial and means carried by said rod for indicating the position of an identifying mark on said motor.

7. A device of the class described comprising, an element adapted to be mounted on a motor having spark plugs, means connected to said element and arranged to engage a pair of said plugs to locate said element in a predetermined position on said motor, and a plurality of graduated members carried by said element and arranged to be manipulated to measure the coordinates of an identifying mark on the vehicle.

In testimony whereof, I have hereunto signed my name to this specification.

WILLIAM D. COOPER.